(12) United States Patent
Hu et al.

(10) Patent No.: US 9,729,382 B2
(45) Date of Patent: Aug. 8, 2017

(54) METHOD AND APPARATUS FOR REALIZING LOAD BALANCE IN DISTRIBUTED HASH TABLE NETWORK

(75) Inventors: Xuechuan Hu, Shenzhen (CN); Wei Wang, Shenzhen (CN); Zhenwu Hao, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 1137 days.

(21) Appl. No.: 13/881,946

(22) PCT Filed: Jun. 9, 2011

(86) PCT No.: PCT/CN2011/075553
§ 371 (c)(1),
(2), (4) Date: Jul. 8, 2013

(87) PCT Pub. No.: WO2012/055242
PCT Pub. Date: May 3, 2012

(65) Prior Publication Data
US 2013/0304888 A1     Nov. 14, 2013

(30) Foreign Application Priority Data
Oct. 27, 2010    (CN) .......................... 2010 1 0522805

(51) Int. Cl.
*G06F 15/16*      (2006.01)
*H04L 12/24*      (2006.01)
(Continued)

(52) U.S. Cl.
CPC .............. *H04L 41/00* (2013.01); *H04L 45/38* (2013.01); *H04L 67/1023* (2013.01);
(Continued)

(58) Field of Classification Search
CPC ...................................................... H04L 41/00
(Continued)

(56) References Cited

U.S. PATENT DOCUMENTS

2004/0215622 A1*   10/2004   Dubnicki ................ H04L 29/06

FOREIGN PATENT DOCUMENTS

| CN | 1988518 A | 6/2007 |
|---|---|---|
| CN | 10183489 A | 9/2010 |

OTHER PUBLICATIONS

Z. Li, C. Lu and Y. Zhang, "Research of Load-Balancing in P2P Network Based on Matching Load Capacity with ID Address Space," Information Technology and Computer Science, 2009. ITCS 2009. International Conference on, Kiev, 2009, pp. 400-403.*

(Continued)

*Primary Examiner* — Melvin H Pollack
*Assistant Examiner* — Messeret F Gebre
(74) *Attorney, Agent, or Firm* — Koppel, Patrick, Heybl & Philpott

(57) ABSTRACT

The disclosure discloses a method and an apparatus for realizing load balance in a DHT network, wherein the method comprises: determining the quantity Z of first virtual identifiers according to the node planning of the DHT network and a preset threshold of load unbalance degree, wherein Z is a natural number; equally dividing the whole load space of the DHT network into Z portions, and each portion of the load space is respectively identified by a different first virtual identifier; allocating the Z first virtual identifiers to each node according to the ability of each node so that each node is in charge of the load space corresponding to the first virtual identifier allocated to the node. The disclosure can reduce workload for managing and transferring virtual identifiers while realizing data storage load balance in the DHT network.

13 Claims, 9 Drawing Sheets

(51) Int. Cl.
*H04L 12/721* (2013.01)
*H04L 29/08* (2006.01)
*H04L 12/741* (2013.01)
*H04L 29/12* (2006.01)

(52) U.S. Cl.
CPC .......... *H04L 67/1065* (2013.01); *H04L 45/74* (2013.01); *H04L 61/1582* (2013.01); *H04L 61/2038* (2013.01)

(58) Field of Classification Search
USPC ........................................................ 709/223
See application file for complete search history.

(56) References Cited

OTHER PUBLICATIONS

A Rao, K Lakshminarayanan, S Surana, R Kar, "load balancing in structured Peer-to-Peer Systems", 2003.*

Haiying Shen, "Hash-based proximity clustering for load balancing in heterogeneous DHT networks", Haiying Shen, pp. 40-41, 2006.*
E. Nikolaos, C. Athanasios, D. Spiros and K. Odysseas, "NGL01-2: Enabling Locality in a Balanced Peer-to-Peer Overlay," IEEE Globecom 2006, San Francisco, CA, 2006, pp. 1-5.*
Rizzo, Giuseppe, "A peer-to-peer architecture for distributed and reliable RDF storage", Rizzo, Giuseppe, 2009 p. 94-99.*
Y. Zhu and Y. Hu, "Efficient, proximity-aware load balancing for DHT-based P2P systems," in IEEE Transactions on Parallel and Distributed Systems, vol. 16, No. 4, pp. 349-361.*
International Search Report (Form PCT/ISA/210) for PCT/CN2011/075553, mailed Sep. 29, 2011.
Chen Hongliang, et al. "Hierarchical Chord Model Based on Locality", Computer Engineering, vol. 35, No. 21, Nov. 2009, pp. 114-116.
Stoica Ion et al. "Chord: A Scalable Peer-to-Peer Lookup Protocol for Internet Applications", IEEE/ACM Transactions on Networking, vol. 11, No. 1, Feb. 28, 2003.

* cited by examiner

METHOD AND APPARATUS FOR REALIZING LOAD BALANCE IN DISTRIBUTED HASH TABLE NETWORK

FIELD OF THE INVENTION

The disclosure relates to the communication field, and more particularly to a method and an apparatus for realizing load balance in a Distributed Hash Table (DHT) network.

BACKGROUND OF THE INVENTION

At present, the DHT has become the main organization form of the P2P overlay network, and its storage load balance is mainly realized by using virtual identifiers. In the distributed hash overlay network, there are two kinds of identifiers: the node ID and the virtual identifier. The node ID is used to differentiate different nodes so as to maintain the DHT overlay network, and the virtual identifier is used to divide the hash table space into several portions and allocate the same to each node. In a DHT overlay network, each node ID is different, and each virtual identifier is different as well. It is allowed that a node ID is the same as a virtual identifier. In the overlay network, the Hash Table space is divided into several portions according to all the virtual identifiers of all the nodes and certain dividing rules. The quantity of the portions is equal to that of the virtual identifiers, and each portion correlates with one virtual identifier. The Hash Table portion is under the charge of the node to which the virtual identifier correlating to the portion belongs. Each node is allocated with multiple virtual identifiers, so that it has to be in charge of multiple Hash Table portions. And, each data resource in the overlay network is allocated with a unique resource identifier. If the resource identifier of a data resource is in a Hash Table portion, the data resource is stored by the node in charge of the virtual identifier in the Hash Table portion. Thus, all the nodes ID and virtual identifiers in the overlay network form two different logic rings. The virtual identifiers make a detailed division to the Hash Table space. Each virtual identifier is in charge of the corresponding Hash block, and the data resource of the resource identifier falling in the Hash block is stored by the virtual identifier, thus achieving the effect of improving the network load balance.

As shown in FIG. 1, it is supposed that a Hash space is 0-63 and is equally divided into 12 portions by 12 virtual identifiers. In the network, there are four nodes, which are A, B, C and D respectively. The four nodes have their own node IDs: N1, N9, N28, N49, and the ability of each node is supposed to be the same. Then each node has three virtual identifiers. For example, node B has three virtual identifiers: P8, P28 and P43. The resource object is stored by the corresponding virtual identifier according to the relation between resource identifier and virtual identifier (if the resource identifier is K5, the virtual identifier P8 is in charge of it). In this case, as shown in Table 1, the Hash blocks under the charge of the three virtual identifiers of Node B are: (1, 8], (23, 28] and (38, 43]. The resources whose resource identifiers are in these space are under the charge of Node B. Thus the data resource space stored in each of the four nodes is 15 under this load balance method. See Table 1 for details. Since the resource identifiers are uniformly distributed in the whole Hash space, the data resource that each node is in charge of is in balance.

TABLE 1

| Node ID | A | | | B | | | C | | | D | | |
|---|---|---|---|---|---|---|---|---|---|---|---|---|
| Dividing identifier | P3 | P18 | P38 | P8 | P28 | P43 | P23 | P48 | P58 | P13 | P33 | P53 |
| Data block | (58, 3] | (13, 18] | (33, 38] | (3,8] | (23, 28] | (38, 43] | (18, 23] | (43, 48] | (53, 58] | (8,13] | (28, 33] | (48, 53] |
| Data space in charge of | 5 | 5 | 5 | 5 | 5 | 5 | 5 | 5 | 5 | 5 | 5 | 5 |
| Data space under the charge of each node | | 15 | | | 15 | | | 15 | | | 15 | |

The inventors find that in the related art, to balance the load among nodes, the whole Hash space is equally divided into Q portions (that is, each is allocated with Q virtual identifiers), wherein Q is much greater than the quantity S of nodes. Then the virtual identifiers are allocated according to the ability of each node. For example, as shown in FIG. 2, the whole resource Hash space is equally divided into 10000 portions by 10000 virtual identifiers (circles on the outer ring). There are 10 nodes (circles on the inner ring) in the overlay network. Then, each node is in charge of 1000 virtual identifiers if the ability of each node is the same, which will increase workload for managing and transferring virtual identifiers. This is not convenient for managing and transferring virtual identifiers.

SUMMARY OF THE INVENTION

The disclosure mainly aims at providing a solution for realizing load balance in a DHT network, to solve the problem of heavy workload of managing and transferring virtual identifiers caused by that each node is in charge of too many virtual identifiers.

According to one aspect of the disclosure, a method for realizing load balance in a DHT network is provided, comprising: determining a quantity Z of first virtual identifiers according to node planning of the DHT network and a preset threshold of load unbalance degree, wherein Z is a natural number; equally dividing whole load space of the DHT network into Z portions, wherein each portion of the load space is respectively identified by one different first virtual identifier; and allocating the Z first virtual identifiers to each node according to ability of the each node, so that the each node is in charge of the load space corresponding to the first virtual identifiers allocated to the each node.

Determining the quantity Z of the first virtual identifiers according to the node planning of the DHT network and the preset threshold of load unbalance degree comprises: acquiring a node with the poorest ability in the DHT network; and determining the quantity Z of the first virtual identifiers according to the threshold of load unbalance degree, so as to make the load unbalance degree of the node with the poorest ability less than the threshold of load unbalance degree.

The quantity Z of the first virtual identifiers is determined to satisfy a formula of:

$$\frac{\frac{C_i}{\sum_{k=1}^{N} C_k} \times S + \frac{S}{Z}}{\frac{C_i}{\sum_{k=1}^{N} C_k} \times S} - 1 < LN,$$

wherein $C_i$ is capacity of the node with the poorest ability, N is the total number of the nodes in the DHT network, S is the whole load space of the DHT network and LN is the threshold of load unbalance degree.

The method above further comprises: adding a new node to the DHT network; according to ability of the new node, calculating the quantity of the first virtual identifiers that the new node should be in charge of; and allocating to the new node part of the first virtual identifiers under the charge of a node of the DHT network, the quantity of the first virtual identifiers under the charge of which exceeds a theoretical value, so as to make the quantity of the first virtual identifiers that the new node is in charge of close to the quantity of the first virtual identifiers that the new node should be in charge of.

Allocating to the new node part of the first virtual identifiers under the charge of the node of the DHT network, the quantity of the first virtual identifiers under the charge of which exceeds the theoretical value comprises: according to the ability of the each node in the DHT network, calculating the theoretical value of the first virtual identifiers that the each node should be in charge of after a new node is added; and determining for the each node whether the quantity of the first virtual identifiers that the node is currently in charge of exceeds the theoretical value of the node, and if yes, taking randomly the first virtual identifiers that exceed the theoretical value of the node from all the first virtual identifiers that the node is in charge of, and allocating the first virtual identifiers that exceed the theoretical value of the node to the new node.

The method above further comprises: the load unbalance degree of one node in the DHT network exceeding the threshold of load unbalance degree; and equally re-dividing the load space corresponding to each first virtual identifier allocated to the each node into M portions, and identifying each portion of the load space equally re-divided with M×Z second virtual identifiers, wherein M is a natural number and M≥2.

After identifying the each portion of the load space equally re-divided with the M×Z second virtual identifiers, the method further comprises: adjusting a quantity of the second virtual identifiers under the charge of the each node according to the load unbalance degree of the each node in the DHT network, so as to reduce the load unbalance degree of the node whose load unbalance degree exceeds the threshold of load unbalance degree.

After identifying the each portion of the load space equally re-divided with the M×Z second virtual identifiers, the method further comprises: adding a new node to the DHT network; and allocating to the new node part of the second virtual identifiers under the charge of the node of the DHT network, the quantity of the second virtual identifiers under the charge of which exceeds a theoretical value, so as to make the quantity of the second virtual identifiers that the new node is in charge of close to the quantity of the second virtual identifiers that the new node should be in charge of.

The method above further comprises: adding a new node to the DHT network; equally re-dividing the load space corresponding to each first virtual identifier into M portions and identifying each portion of the load space equally re-divided with M×Z second virtual identifiers, wherein M is a natural number and M≥2; according to ability of the new node, calculating a quantity of the second virtual identifiers that the new node should be in charge of; and allocating to the new node part of the second virtual identifiers under the charge of a node of the DHT network, the quantity of the second virtual identifiers under the charge of which exceeds a theoretical value, so as to make the quantity of the second virtual identifiers that the new node is in charge of close to the quantity of the second virtual identifiers that the new node should be in charge of.

Allocating to the new node part of the second virtual identifiers under the charge of the node of the DHT network, the quantity of the second virtual identifiers under the charge of which exceeds the theoretical value comprises: according to the ability of the each node in the DHT network, calculating the theoretical value of the second virtual identifiers that the each node should be in charge of after the new node is added; and determining for the each node whether the quantity of the second virtual identifiers that the node is currently in charge of exceeds the theoretical value of the node, and if yes, taking randomly the second virtual identifiers that exceed the theoretical value of the node from all the second virtual identifiers that the node is in charge of, and allocating the second virtual identifiers that exceed the theoretical value of the node to the new node.

Identifying the each portion of the load space equally re-divided with the M×Z second virtual identifiers comprises: for the Z first virtual identifiers, generating M−1 new virtual identifiers between two consecutive first virtual identifiers, and taking a former virtual identifier of the two consecutive first virtual identifiers and the M−1 new virtual identifiers as M second virtual identifiers to identify the M portions of the load space equally divided from the load space corresponding to the former first virtual identifier.

According to another aspect of the disclosure, an apparatus for realizing load balance in a DHT network is provided, comprising: a determination module, configured to determine a quantity Z of first virtual identifiers according to node planning of the DHT network and a preset threshold of load unbalance degree, wherein Z is a natural number; a dividing module, configured to equally divide whole load space of the DHT network into Z portions, wherein each portion of the load space is respectively identified by one different first virtual identifier; and an allocating module, configured to allocate the Z first virtual identifiers to each node according to ability of the each node, so that the each node is in charge of the load space corresponding to the first virtual identifiers allocated to the each node.

The apparatus above further comprises: a re-dividing module, configured to equally re-divide the load space corresponding to each first virtual identifier allocated to the each node into M portions, and identify each portion of the load space equally re-divided with M×Z second virtual identifiers, wherein M is a natural number and M≥2; and wherein the allocating module is further configured to allocate the M×Z second virtual identifiers to the each node according to the ability of the each node in the DHT network, so that the each node is in charge of the load space corresponding to the second virtual identifier allocated to the each node.

The apparatus above further comprises: an updating module, configured to update a query routing table of the DHT network after the allocating module allocates the M×Z second virtual identifiers to the each node.

Through the disclosure, the quantity of divided portions of the whole load space of the DHT network is determined according to the node planning of the DHT network and a preset threshold of load unbalance degree. This solution allows the virtual identifiers under the charge of each node to be adapted to the node planning of the current DHT network, reducing workload for managing and transferring virtual identifiers while realizing data storage load balance in the DHT network.

BRIEF DESCRIPTION OF THE DRAWINGS

The drawings disclosed herein constitute a part of the application and provide for further understanding the disclosure. The exemplary embodiments of the disclosure and the description thereof are used to illustrate rather than limit the disclosure. In the drawings.

DETAILED DESCRIPTION OF THE EMBODIMENTS

Figure 1:
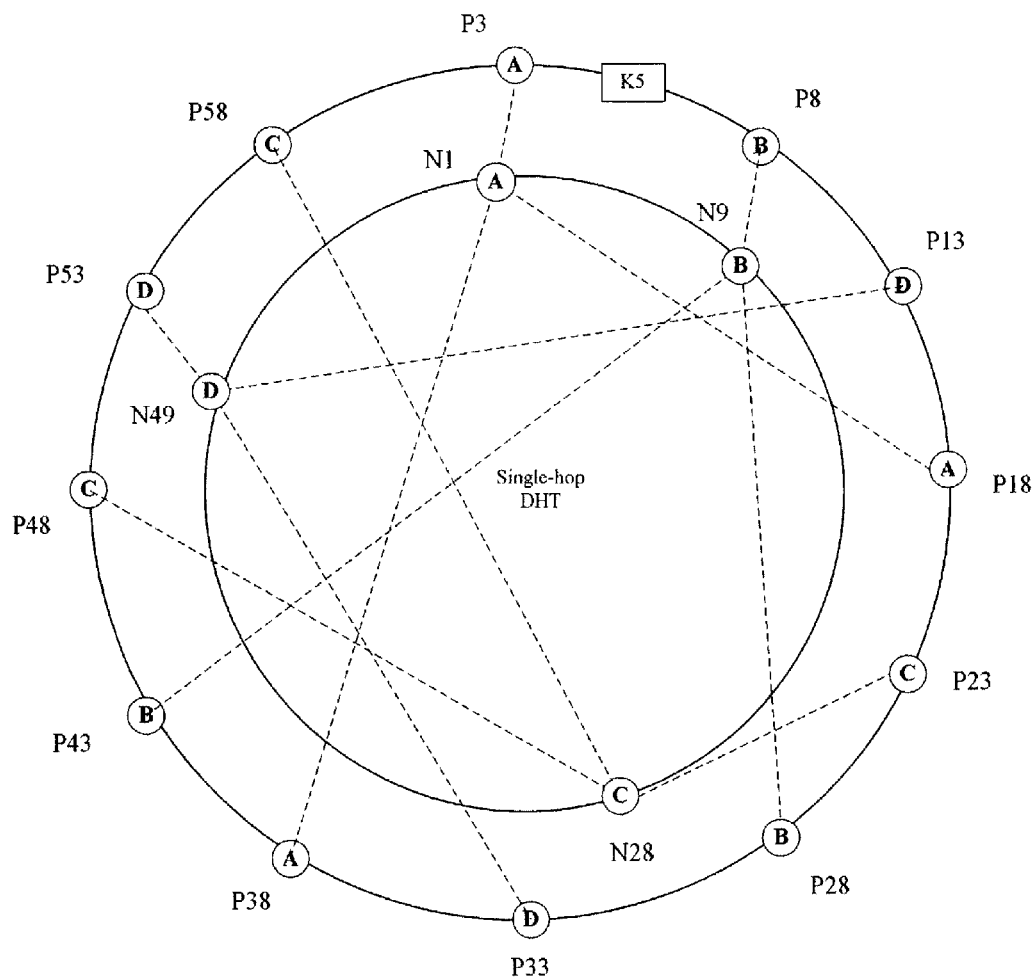
FIG. 1 is a schematic diagram of load balance with virtual identifiers in a single-hop DHT network in the related art.
Figure 2:
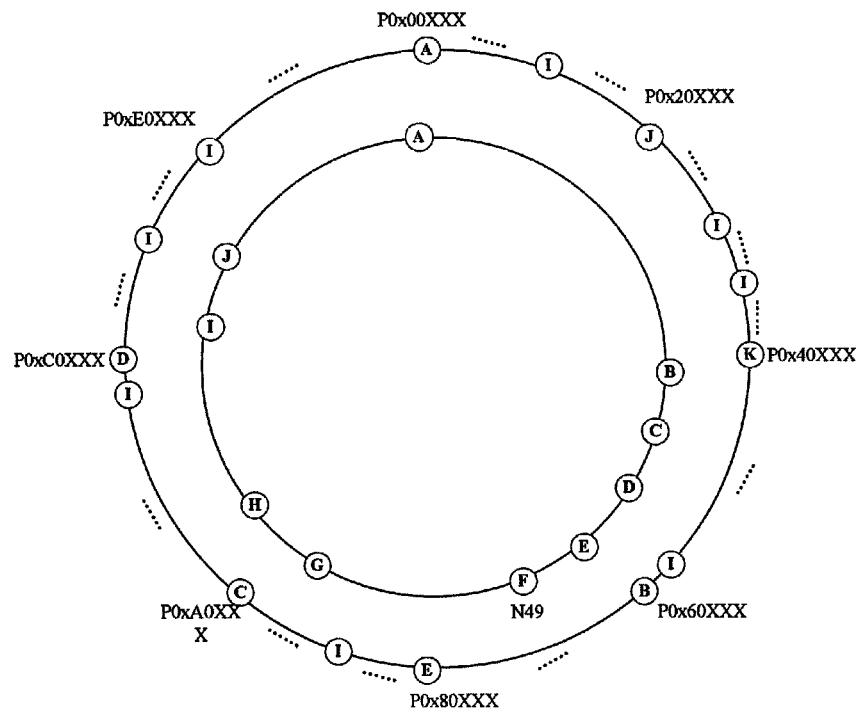
FIG. 2 is a schematic diagram of load balance when the quantity of virtual identifiers is much more than that of nodes in the related art.

The disclosure will be further illustrated hereinafter in conjunction with the drawings and the embodiments. It should be noted that in the application, the embodiments and the features in the embodiments can be combined with each other if no conflict occurs.

To better understand the disclosure, the definitions of the parameters related to the node load involved in the disclosure are illustrated below.

Node capacity—C: a node with high capacity can bear more loads. In practical applications, the node capacity $C_i$ can be measured through resources such as CPU, memory, wideband and connection stability of the node. The specific measurement methods include experimental measurement, empirical data or dynamic updating, etc. Generally speaking, the node capacity is limited by the most insufficient resource among its CPU, memory and wideband, etc. In the embodiments of the disclosure, the ID space is used to measure the actual loading situation of the nodes. Therefore, the node capacity $C_i$ can be expressed as the size of the load space (ID space for short) corresponding to the virtual identifiers (ID) that the node should be in charge of according to its ability. For example, the capacity of the node with the poorest performance in a DHT network can be defined as a reference value (recorded as $C_{min}$), and then the capacity of other nodes can be expressed as $mC_{min}$, wherein m is the ratio of the performance of the node to that of the node with the poorest performance.

Load unbalance degree of a node—LB: it represents the deviation degree of a node's actual load from the balanced load in an ideal condition. In the embodiments of the disclosure, the storage load of a node is represented by the size of the ID space that the node is in charge of. In an ideal state, the size of the ID space that a node is actually in charge of is equal to that of the ID space that the node should be in charge of according to its node capacity. Therefore, the load unbalance degree of a node can be defined as:

size of the ID space that a node is actually in charge of/size of the ID space that Node i should be in charge of −1, wherein the size of the ID space that a node is in charge of is equal to the sum of the sizes of the ID spaces that all the virtual IDs owned by the node are in charge of. While the size of the ID space that a node should be in charge of should be calculated according to the node capacities of all the nodes in the network. The size of the ID space that Node i should be in charge of is:

$$\frac{C_i}{\sum_{k=1}^{N} C_k} \times S,$$

wherein N is the quantity of nodes in the network and S is the size of the total ID space.

The threshold of load unbalance degree—LN: it is the balancing target to be realized by the load balancing algorithm. That is, the absolute values of the load unbalance degree LB of all the nodes in the network should be less than the threshold LN.

The quantity of the virtual nodes—V: it represents the quantity of the virtual nodes (namely the virtual identifiers) owned by each physical node. For example, the quantity of the virtual nodes owned by the node (node capacity is $C_{min}$) with the poorest performance in the network can be defined as $V_{min}$, and the quantity of the virtual nodes owned by the node with a node capacity of $mC_{min}$ is $[mV_{min}]$.

Embodiment 1

Figure 3:
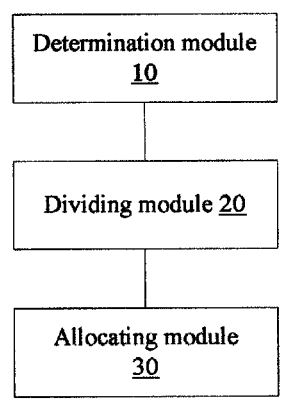
FIG. 3 is a schematic diagram of the structure of the apparatus for realizing load balance in a DHT network according to Embodiment 1 of the disclosure.

FIG. 3 is a schematic diagram of the structure of the apparatus for realizing load balance in a DHT network according to the embodiment of the disclosure. This apparatus can allocate virtual identifiers to each node in the DHT network in the early stage of the establishment of a DHT network.

As shown in FIG. 3, the apparatus mainly comprises: a determination module 10, a dividing module 20 and an allocating module 30, wherein the determination module 10 is configured to determine the quantity Z of virtual identifiers according to the node planning of the DHT network and a preset threshold of load unbalance degree, wherein Z is a natural number; the dividing module 20 is configured to equally divide the whole load space of the DHT network into Z portions, and each portion of the load space is respectively identified by a different virtual identifier; and the allocating module 30 is configured to allocate the Z virtual identifiers to each node according to the ability of each node so that each node is in charge of the load space corresponding to the virtual identifiers allocated to the node.

In the above, the node planning of the DHT network comprises, but is not limited to: the quantity of the nodes in the DHT network and the capacity of each node (namely the ability).

When the node capacity is different, the theoretical value of virtual IDs loaded on each node is proportional to its capacity. At most, the virtual IDs that a node is actually in charge of can deviate from the theoretical value by 1. Thus, the node with the lowest capacity has the highest load unbalance degree. Therefore, in the embodiment of the disclosure, in determining the total number of virtual IDs in the DHT network, it is only required to ensure the total number of Z can enable the node with the lowest capacity to meet load balance requirement, that is, to make the load unbalance degree of the node with the lowest capacity less than the threshold of load unbalance degree. For Node i in the DHT network, the formula below should be satisfied:

(size of the ID space that Node $i$ is actually in charge of/size of the ID space that Node $i$ should be in charge of)−1<threshold of load unbalance degree.

Supposing the quantity of virtual identifiers is Z, Node i with the lowest capacity loads extra Δ space (S/Z), wherein S is the whole load space of the DHT network. Then, the determination module 10 can determine Z with the formula below:

$$\frac{\frac{C_i}{\sum_{k=1}^{N} C_k} \times S + \frac{S}{Z}}{\frac{C_i}{\sum_{k=1}^{N} C_k} \times S} - 1 < LN.$$

By solving the formula, we can obtain:

$$z > \frac{\sum_{k=1}^{N} C_k}{C_i \times LN}.$$

For example, the initially planned scale N of the network has 100 nodes, and the maximum load unbalance degree LN is controlled below 10%. If the capacity value C of the node ability is the same, the quantity of virtual identifiers according to the formula must be greater than 1000.

In practical applications, the apparatus above can be set at the management service node of the DHT network.

Through the above apparatus according to the embodiment of the disclosure, in the early stage of the establishment of a network, the determination module 10 determines the quantity of divided portions of the whole load space according to the node planning of the DHT network and a preset threshold of load unbalance degree. This solution allows the quantity of virtual identifiers to be adapted to the DHT network, and avoids too heavy workload for managing and transferring virtual identifiers caused by that each node is in charge of too many virtual identifiers.

Figure 4:
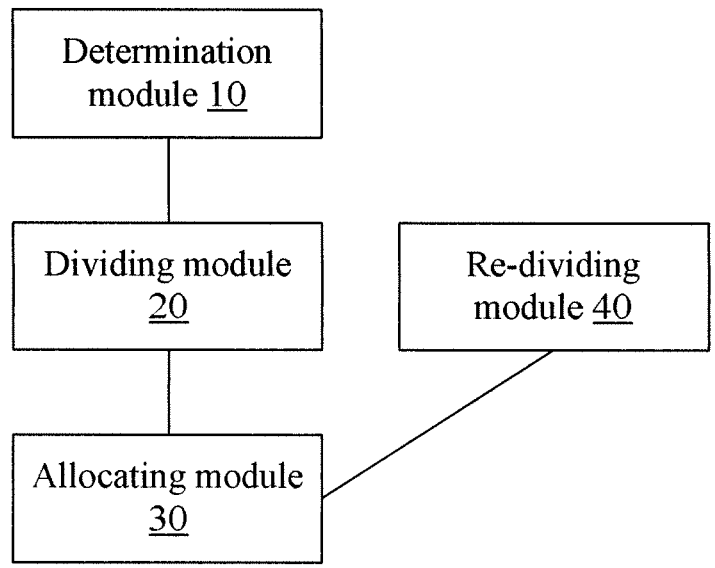
FIG. 4 is a schematic diagram of the structure of the apparatus for realizing load balance in a preferred DHT network according to Embodiment 1 of the disclosure.

In one preferred embodiment of the disclosure, as shown in FIG. 4, the apparatus further comprises: a re-dividing module 40, configured to equally re-divide the load space corresponding to each virtual identifier allocated to each node into M portions (referred to as re-dividing of the virtual identifiers in the embodiments of the disclosure) and identify each portion of the load space equally re-divided with M×Z virtual identifiers, wherein M is a natural number and M≥2. The allocating module 30 is further configured to allocate the M×Z re-divided virtual identifiers to each node according to the ability of each node in the DHT network, so that each node is in charge of the load space corresponding to the virtual identifiers allocated to the node.

For example, the re-dividing module 40 can execute the re-dividing function above when the load unbalance degree of a node exceeds the threshold of load unbalance degree. In this case, the function of the re-dividing module 40 can be accomplished by a management service node or other node in the DHT network. And in this case, after the re-dividing, the re-dividing module 40 can trigger the allocating module 30 directly to adjust the virtual identifiers that each node is in charge of in the DHT network according to the re-divided virtual identifiers, so as to reduce the load unbalance degree of the node with a high load unbalance degree. Or, it can be that the allocating module 30 is not triggered, and the allocating module 30 allocates virtual identifiers to the new node according to the re-divided virtual identifiers, when a new node is added. Or, the re-dividing module 40 can execute the re-dividing function above when a new node is added to the DHT network, and the allocating module 30 allocates to the new node the excessive part of the virtual identifiers of the node, the quantity of re-divided virtual identifiers under the charge of which exceeds the theoretical value. In this case, the function of the re-dividing module 40 can be accomplished by a management service node or the node in charge of the new node. With the preferred embodiment, the load balance of each node can be ensured when a network is further expanded.

In another preferred embodiment of the disclosure, as shown in FIG. 4, the apparatus further comprises: an updating module 50, configured to update the query routing table of the DHT network after the allocating module 30 allocates the M×Z re-divided virtual identifiers to each node. Thus the re-divided virtual identifiers can be used for data storage in the DHT network after re-allocation of the re-divided virtual identifiers.

Embodiment 2

Figure 5:
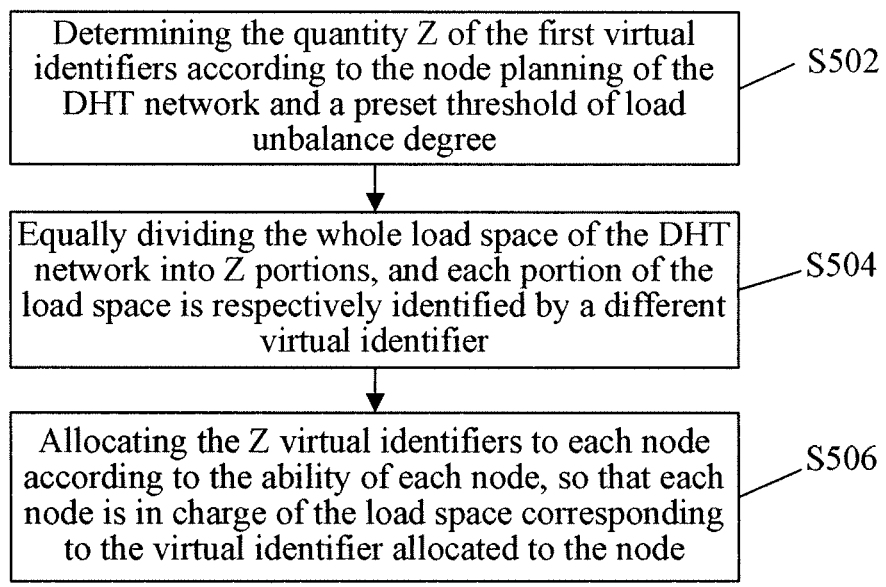
FIG. 5 is a flow chart of the method for realizing load balance in a DHT network according to Embodiment 2 of the disclosure.

FIG. 5 is a flow chart of the method for realizing load balance in a DHT network according to the embodiment of the disclosure. The method can be realized with the apparatus described in Embodiment 1. As shown in FIG. 5, the method mainly comprises the steps below.

Step S502, determining the quantity Z of first virtual identifiers according to the node planning of the DHT network and a preset threshold of load unbalance degree, wherein Z is a natural number.

In the above, the node planning of the DHT network comprises but is not limited to: the quantity of the nodes in the DHT network and the capacity of each node.

When the node capacity is different, the theoretical value of virtual IDs loaded on each node is proportional to its capacity. At most, the virtual IDs that a node is actually in charge of can deviate from the theoretical value by 1. Thus, the node with the lowest capacity has the highest load unbalance degree. Therefore, in the embodiment of the disclosure, in determining the total number of virtual IDs in the DHT network, it is only required to ensure the total number of Z can enable the node with the lowest capacity to meet load balance requirement, that is, to make the load unbalance degree of the node with the lowest capacity less than the threshold of load unbalance degree. For Node i in the DHT network, the formula below should be satisfied:

(size of the ID space that Node $i$ is actually in charge of/size of the ID space that Node $i$ should be in charge of)−1<threshold of load unbalance degree.

Supposing the quantity of virtual identifiers is Z, Node i with the lowest capacity loads extra Δ space (S/Z), wherein S is the whole load space of the DHT network. Then, Z can be determined with the formula below:

$$\frac{\frac{C_i}{\sum\limits_{k=1}^{N} C_k} \times S + \frac{S}{Z}}{\frac{C_i}{\sum\limits_{k=1}^{N} C_k} \times S} - 1 < LN.$$

By solving the formula, we can obtain:

$$z > \frac{\sum\limits_{k=1}^{N} C_k}{C_i \times LN}.$$

Preferably, the value of Z can be the nth power of 2.

For example, the initially planned scale N of the network has 100 nodes, and the maximum load unbalance degree LN is controlled below 10%. If the capacity value C of the node ability is the same, the quantity of virtual identifiers according to the formula must be greater than 1000.

Step S504, equally dividing the whole load space of the DHT network into Z portions, and each portion of the load space is respectively identified by a different virtual identifier.

Step S506, allocating the Z virtual identifiers to each node according to the ability of each node, so that each node is in charge of the load space corresponding to the virtual identifiers allocated to the node.

The quantity of the virtual identifiers that a node should load is calculated according to the ability $C_i$ of the node. The Z virtual identifiers are allocated to each node, so as to make the quantity of the virtual identifiers allocated to each node reach, as much as possible, the quantity (namely the theoretical value) of virtual identifiers that the node should load. In this case, the node with strong ability acquires more virtual identifiers, while the node with weak ability acquires less virtual identifiers. The load space corresponding to the virtual identifiers is equal divided. And, it is possible that the theoretical load space value of each node is not equal to the sum of the space that X virtual identifiers are in charge of. Therefore, the space that a node is actually in charge of may be different from the space that the node should be in charge of theoretically. But, the maximum deviation will not exceed the Δ space corresponding to one virtual identifier.

After virtual identifiers are allocated to each node according to the steps above, when a new node is added to the network, the new node can be allocated with virtual identifiers according to the steps below.

Step 1: adding a new node to the DHT network.

Step 2, calculating the quantity X of virtual identifiers that the new node i should be in charge of according to the ability of the new node:

$$X = \frac{C_i}{\sum\limits_{k=1}^{N+1} C_k}. \tag{1}$$

Step 3, allocating to the new node part of the virtual identifiers of the node in the DHT network, the quantity of the virtual identifiers of which exceeds the theoretical value, so as to make the quantity of the virtual identifiers that the new node is in charge of close to the X above.

For example, the theoretical value $X_j$ of virtual identifiers that each node should be in charge of:

$$X_j = \frac{C_j}{\sum\limits_{k=1}^{N+1} C_k} \times Z.$$

If the quantity of the virtual identifiers that each node is currently in charge of is $Y_j$, the quantity of the virtual identifiers of each node exceeding the theoretical value is the difference of $Y_j$ and $X_j$. For the node the difference of which is greater than 0, virtual identifiers of the quantity of the above difference can be randomly taken from the virtual identifiers that the node is in charge of, and be allocated to the new node.

If the load unbalance degree of a virtual identifier is found to be exceeding the threshold of load unbalance degree after allocating the virtual identifiers to the new node, the Z virtual identifiers above can be re-divided. Or, the Z virtual identifiers above can be re-divided directly when a new node is added. In this case, the re-dividing of the Z virtual identifiers can be realized through the steps below.

Step 1: equally re-dividing the load space corresponding to each virtual identifier allocated to each node into M portions.

Step 2, identifying each portion of the load space equally re-divided with M×Z virtual identifiers (to distinguish from the virtual identifiers before the re-dividing, the re-divided virtual identifiers are called the second virtual identifiers), wherein M is a natural number and M≥2.

For example, M−1 new virtual identifiers can be generated between two consecutive virtual identifiers before the re-dividing. The former virtual identifier in the two consecutive virtual identifiers before the re-dividing and the M−1 new virtual identifiers can be taken as M re-divided virtual identifiers (namely the second virtual identifiers above). The M portions of the load space equally divided from the load space corresponding to the above former first virtual identifier can be identified with the M re-divided virtual identifiers.

In the case that the addition of a new node triggers the re-dividing of the virtual identifiers, after re-dividing the virtual identifiers, the virtual identifiers that each node is in charge of can be re-divided as the second virtual identifiers. The quantity (namely the theoretical value) of the second virtual identifiers that each node should be in charge of after the addition of a new node can be calculated. For the node, the quantity of the second virtual identifiers actually under the charge of which exceeds the theoretical value, the second virtual identifiers of the quantity of (the quantity of the second virtual identifiers that the node is actually in charge of—the quantity of the virtual identifiers that the node should be in charge of) can be taken from all the second virtual identifiers that the node is in charge of, and be allocated to the new node.

If the re-dividing of virtual identifiers is triggered by that the load unbalance degree of a node in the DHT network exceeds the threshold of load unbalance degree, after the re-dividing, the quantity of the second virtual identifiers that each node is in charge of can be adjusted according to the current load unbalance degree of each node, so as to reduce the load unbalance degree of the node whose load unbalance degree exceeds the threshold of load unbalance degree, and to ensure the load balance of each node.

Through the above method according to the embodiment of the disclosure, in the early stage of the establishment of a network, the quantity of divided portions of the load space can be determined according to the planned scale of the DHT network and a preset threshold of load unbalance degree. This solution allows the quantity of virtual identifiers to be adapted to the DHT network, and avoids too heavy workload for managing and transferring virtual identifiers caused by that each node is in charge of too many virtual identifiers. In network expansion, virtual identifiers can be automatically re-divided, which makes the network expandable.

Embodiment 3

The embodiment of the disclosure is illustrated with the example of adding a new node to a centralized topology network.

Figure 6:
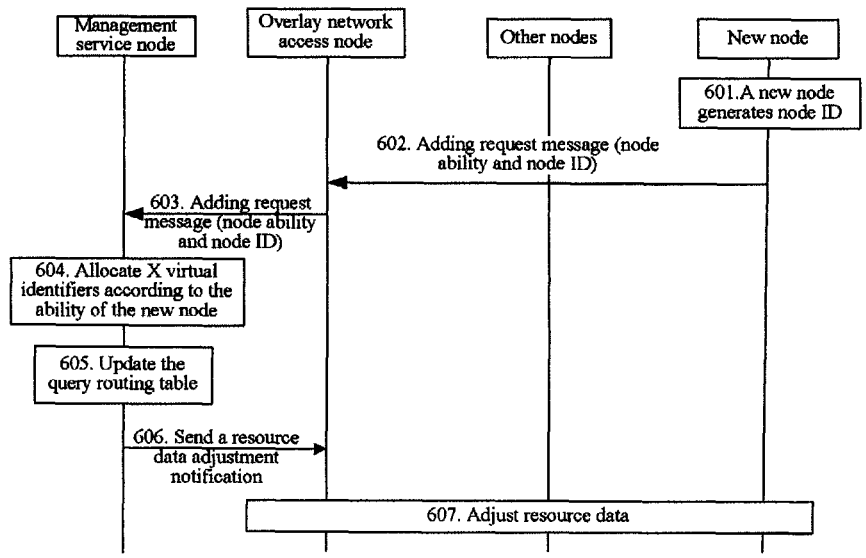
FIG. 6 is a flow chart of adding a new node to a centralized topology network according to Embodiment 3 of the disclosure.

FIG. 6 is a flow chart of adding a new node to a centralized topology network according to the embodiment of the disclosure. As shown in FIG. 6, this process mainly comprises the steps below.

Step S601, a new node generates node ID and the access node of the new node is located according to the size of node ID, wherein the access node is the direct successor node of the new node in the current network.

The node ID is obtained by performing Hash operation to the characteristic information of the node. The characteristic information of the node refers to the unique information of the node, such as IP address, network card number, or machine serial number. The Hash algorithm can be arbitrarily selected. Or, the node ID can be collectively allocated by the operation manager of the network.

Step S602: the new node sends an adding request message to the access node, wherein the adding request message carries the ability value and identifier of the node.

Step S603: the access node forwards the adding request message to the management service node.

Step S604: according to the ability value of the new node, the management service node calculates the quantity of the virtual nodes that the new node should be in charge of and the quantity of the virtual nodes that other nodes should be in charge of after the new node is added, and then randomly allocates the excessive virtual identifiers (namely the difference of the quantity of the virtual identifiers that the node is actually in charge of and that of the virtual identifiers that the node should be in charge of) of the original nodes in the network to the new node.

Step S605: the management service node updates the routing table.

Step S606: the management service node sends a resource data adjustment notification to the access node.

Step S607: the nodes in the overlay network adjust resource data according to the instruction of the management service node.

Through the embodiment of the disclosure, a centralized topology network can be expanded.

Embodiment 4

This embodiment of the disclosure illustrates the procedure of re-dividing virtual identifiers by taking a centralized network as an example. In this embodiment of the disclosure, virtual identifiers are re-divided if the load unbalance degree of a node in a DHT network exceeds the threshold of load unbalance degree. And, the quantity of the virtual identifiers that each node is in charge of is adjusted to reduce the load unbalance degree of the nodes in the DHT network after re-dividing.

Figure 7:
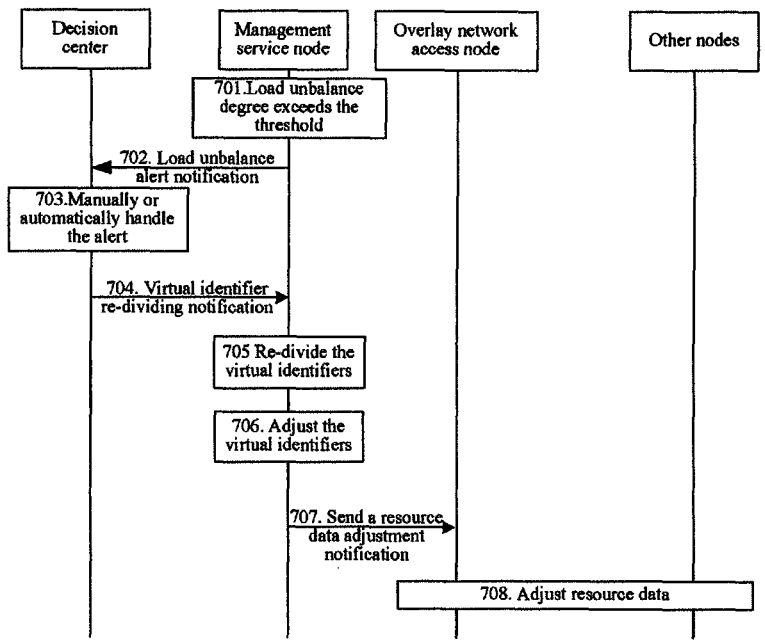
FIG. 7 is a flow chart of re-dividing virtual identifiers of a centralized topology network according to Embodiment 4 of the disclosure.

FIG. 7 is a flow chart of re-dividing virtual identifiers according to the embodiment of the disclosure. As shown in FIG. 7, this process mainly comprises the steps below.

Step S701: as new nodes are added to the overlay network, the network scale is continuously expanded and the load unbalance degree is continuously increased. When the load unbalance degree reaches the threshold, the management service node gives an alert.

Step S702: the management service node sends a alert notification to the decision center (for example the network management platform).

Step S703: after receiving the network load unbalance alert, the decision center can automatically, or can be handled manually to, instruct equally re-dividing of virtual identifiers in the overlay network into M portions.

Step S704: the decision center sends a command to the management service node and requires the management service node to re-divide the virtual identifiers.

Step S705: the management service node equally divides the virtual identifiers into M portions according to the instruction.

For example, there are 8 virtual identifiers originally in the overlay network. After being equally divided into 4 portions, there are 32 virtual identifiers in the overlay network.

Step S706: the management service node adjusts the virtual identifiers of each node according to the load unbalance degree of each node to reduce the unbalance degree.

Step S707: the management service node sends a resource data adjustment notification to the access node of the overlay network.

Step S708: the nodes in the overlay network carry out data adjustment.

Through the embodiment of the disclosure, when the load unbalance degree exceeds the threshold, virtual identifiers can be re-divided. The quantity of the re-divided virtual identifiers that each node is in charge of can be adjusted according to the load unbalance degree of each node, so as to reduce the load unbalance degree of the DHT network.

Embodiment 5

The embodiment of the disclosure illustrates the adding of a new node and re-dividing of virtual identifiers by taking a distributed topology network as an example.

Figure 8:
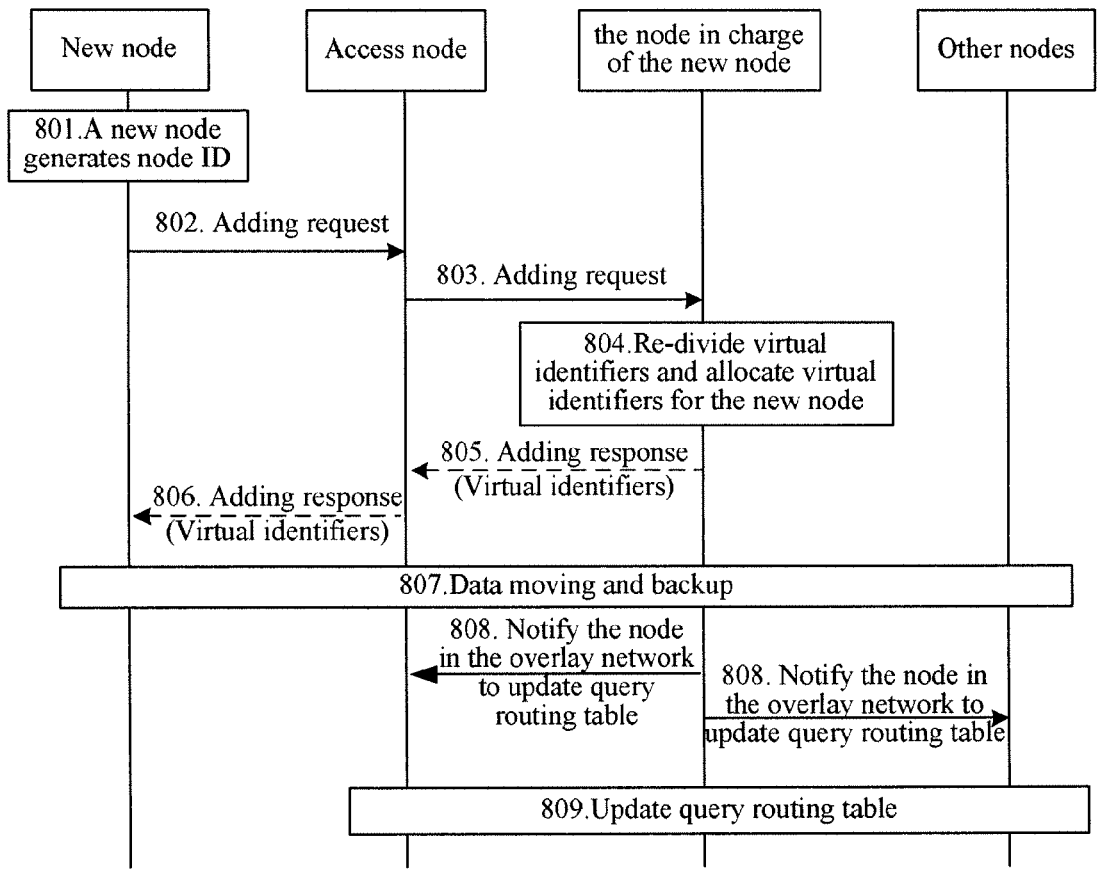
FIG. 8 is a flow chart of adding a new node and re-dividing virtual identifiers in a distributed topology network according to Embodiment 5 of the disclosure.

FIG. 8 is a flow chart of adding a new node and re-dividing virtual identifiers according to the embodiment of the disclosure. As shown in FIG. 8, this process mainly comprises the steps below.

Step S801, a new node generates node ID and the access node of the new node is located according to the size of node ID, wherein the access node is the direct successor node of the new node in the current network.

In the above, the node ID is obtained by performing Hash operation to the characteristic information of the node. The characteristic information of the node refers to the unique information of the node, such as IP address, network card number, or machine serial number. The Hash algorithm can be arbitrarily selected. Or, the node ID can be collectively allocated by the operation manager of the network.

Step S802: the new node sends an adding request message to the access node, wherein the adding request message carries the ability value and identifier of the node.

Step 803: the access node determines the node in charge of the new node (namely the successor of the new node) according to the DHT algorithm, and then forwards the adding request message to the responsible node.

Step S804: the node in charge of the new node re-divides each virtual identifier that each node in the DHT network is in charge of, and allocates X re-divided virtual identifiers to the new node;

wherein, the formula for calculating X is:

$$\left\lfloor X = Z \times \frac{C_i}{\sum_{k=1}^{N} k} \right\rfloor,$$

Z is the quantity of all the virtual identifiers after the dividing in the whole overlay network.

Likewise, the node in charge of the new node calculates the quantity of the re-divided virtual identifiers that each node in the overlay network should be in charge of theoretically. The difference of the quantity of the re-divided virtual identifiers that each node is currently in charge of and that of the virtual identifiers that the node should be in charge of theoretically is the quantity of the virtual identifiers of each node that should be allocated to the new node (set as R). R virtual identifiers are taken randomly from each node and are allocated to the new node, until the quantity reaches X.

Step S805, S806: the node in charge of the new node sends back the response message of adding request along the same route.

Step S807: the node in charge of the new node instructs related nodes to adjust the transferring of resource data.

Step S808: the node in charge of the new node notifies the nodes in the overlay network to update the query routing table.

Step S809: each node in the overlay network updates its query routing table according to the instruction.

It should be noted that in the embodiment of the disclosure, after a new node is added, when the load unbalance degree of a certain node exceeds the threshold, the virtual identifiers can be further re-divided and the quantity of the re-divided virtual identifiers that each node is in charge of can be adjusted according to the load unbalance degree of each node, so as to reduce the load unbalance degree of the DHT network. No details of this process are repeatedly given in the embodiment of the disclosure.

Through the embodiment of the disclosure, when a new node is added, virtual identifiers can be re-divided so as to avoid too great load unbalance degree of the DHT network after the adding of a new node.

Embodiment 6

The embodiment of the disclosure illustrates the procedure of re-dividing virtual identifiers by taking a centralized network as an example. In the embodiment of the disclosure, re-dividing is carried out if the load unbalance degree of a node in a DHT network exceeds the threshold of load unbalance degree. The quantity of the virtual identifiers that each node is in charge of is not adjusted after the dividing. But, the virtual space is allocated on the basis of the re-divided virtual identifiers after a new node is added.

Figure 9:
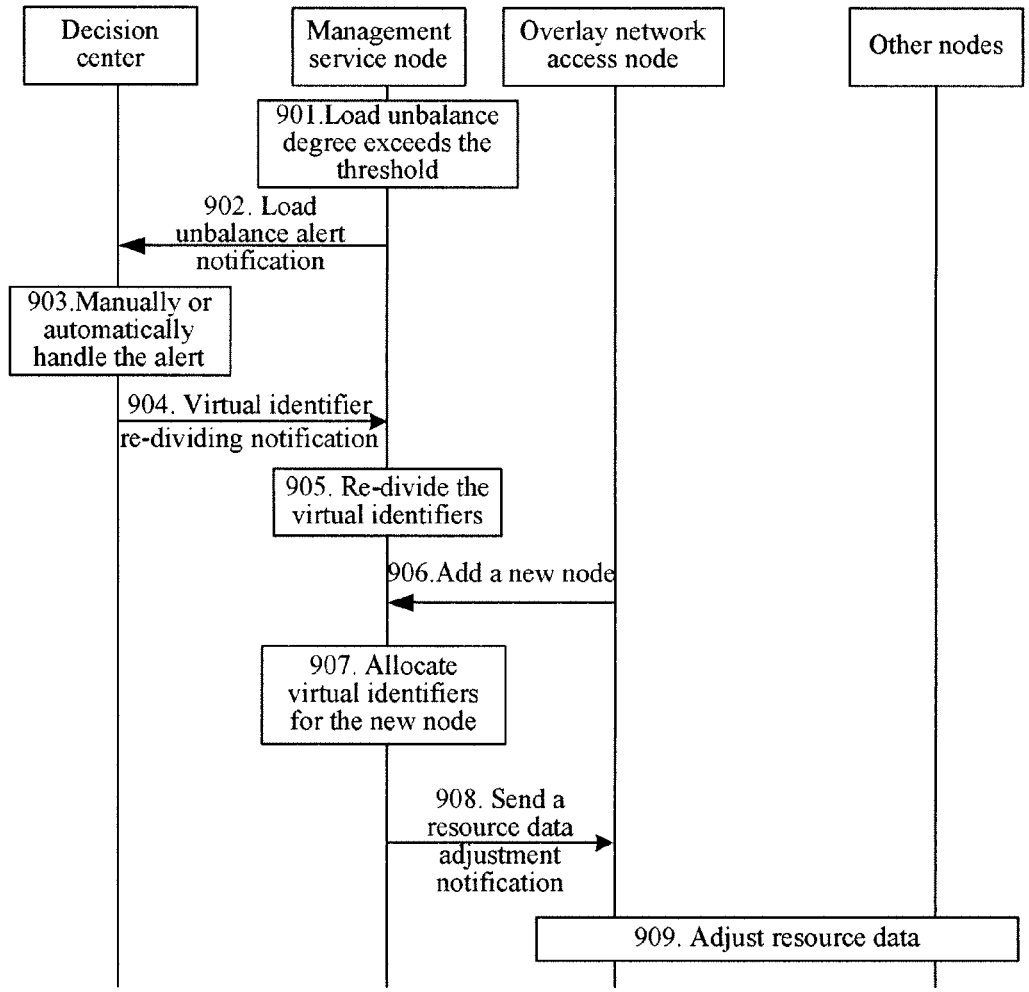
FIG. 9 is a flow chart of re-dividing and allocating virtual identifiers in a centralized topology network according to Embodiment 6 of the disclosure.

FIG. 9 is a flow chart of re-dividing and allocating virtual identifiers according to the embodiment of the disclosure. As shown in FIG. 9, this process mainly comprises the steps below.

Step S901: as new nodes are added to the overlay network, the network scale is continuously expanded and the load unbalance degree is continuously increased. When the load unbalance degree reaches the threshold, the management service node gives an alert.

Step S902: the management service node sends an alert notification to the decision center (for example the network management platform).

Step S903: after receiving the network load unbalance alert, the decision center can automatically, or can be handled manually to, instruct equally re-dividing of virtual identifiers in the overlay network into M portions.

Step S904: the decision center sends a command to the management service node and requires the management service node to re-divide the virtual identifiers.

Step S905: the management service node equally re-divides the virtual identifiers into M portions according to the instruction.

For example, there were 8 virtual identifiers in the overlay network. After being equally re-divided into 4 portions, there are 32 virtual identifiers in the overlay network.

Step S906: the management service node receives a request message that a new node is to be added.

Step S907: according to the ability value of the new node, the management service node allocates X re-divided virtual identifiers to the new node;

wherein, the formula for calculating X is:

$$\left\lfloor X = Z \times \frac{C_i}{\sum_{k=1}^{N} k} \right\rfloor,$$

Z is the quantity of all the re-divided virtual identifiers in the whole overlay network.

Likewise, the service management node calculates the quantity of the virtual identifiers that each node in the network should be in charge of theoretically. The difference of the quantity of the virtual identifiers that each node is currently in charge of and that of the virtual identifiers that the node should be in charge of theoretically is the quantity of the virtual nodes of each node which should be allocated to the new node (set as R). R virtual identifiers are taken randomly from each node and are allocated to the new node, until the quantity reaches X.

Step S908: the management service node sends a resource data adjustment notification to the access node of the overlay network.

Step S909: the nodes in the overlay network carry out data adjustment.

Embodiment 7

The embodiment of the disclosure illustrates the process of virtual identifier re-dividing provided by the embodiment of the disclosure by means of a specific example.

Figure 10:
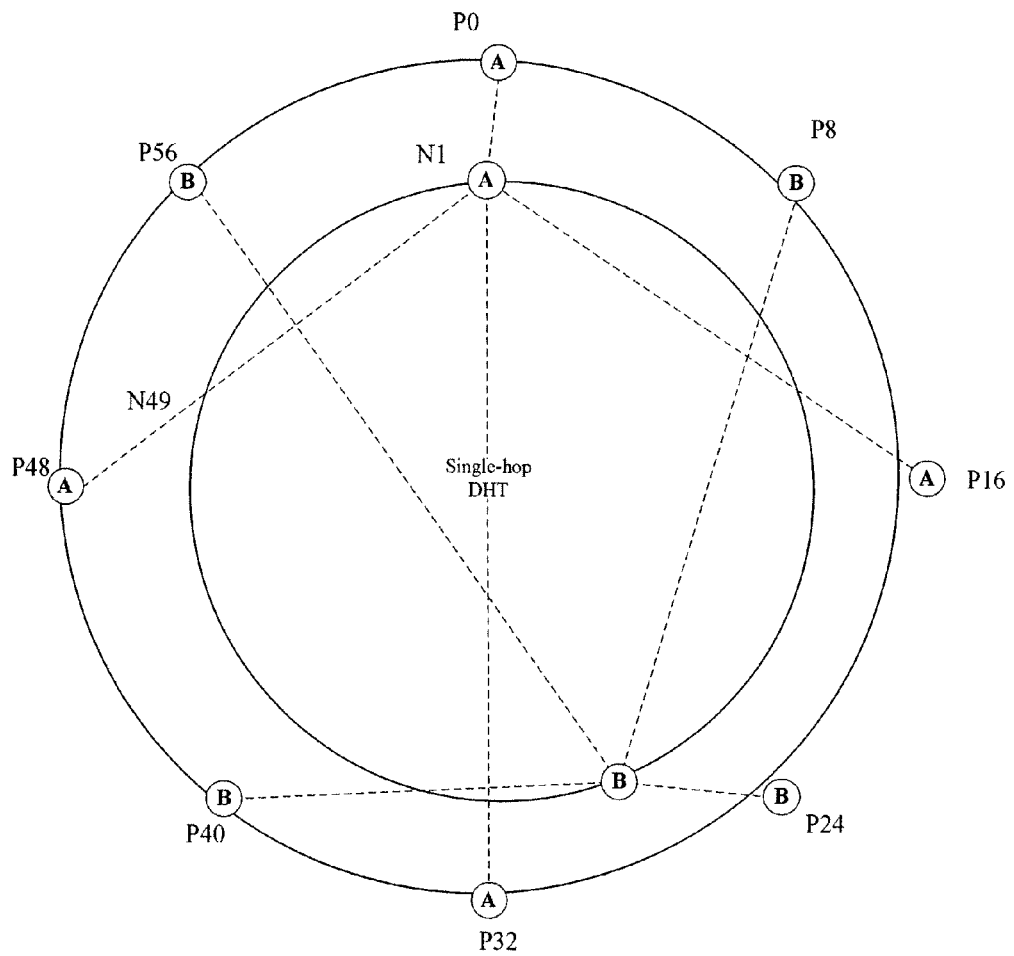
FIG. 10 is a schematic diagram before re-dividing the virtual identifiers according to Embodiment 7 of the disclosure.

In the embodiment of the disclosure, it is supposed that there is a whole Hash space (supposed to be 0-63) and the threshold (LN) of load unbalance degree is 10%. As shown in FIG. 10, there are two nodes A and B in the network, the ability of each node is c. The whole Hash space is equally divided by 8 virtual identifiers. Virtual identifiers P0, P16, P32 and P48 are allocated to Node A, and P8, P24, P40 and P56 are allocated to Node B. Since the ability of the two nodes is the same, each node is allocated with four virtual identifiers. All the virtual identifiers are in charge of equal space. Thus, the storage load of the two nodes is in balance.

When a new node C (its ability is the same as A and B) requests to be added to the overlay network, the space that each node should be in charge of theoretically is:

Node $A$=Node $B$=Node $C=c/(c+c+c)*64=21.33$.

Since the identifiers cannot be divided, the virtual identifiers allocated to the three nodes are: 3, 3 and 2. In this case, two nodes are actually in charge of the space of 24, and the other one is in charge of the space of 16 only. Then the load unbalance degree of each node is 12.49%, 12.49% and −24.98% respectively. All the load unbalance degrees exceed the threshold, re-dividing of the virtual identifiers needs to be performed.

Figure 11:
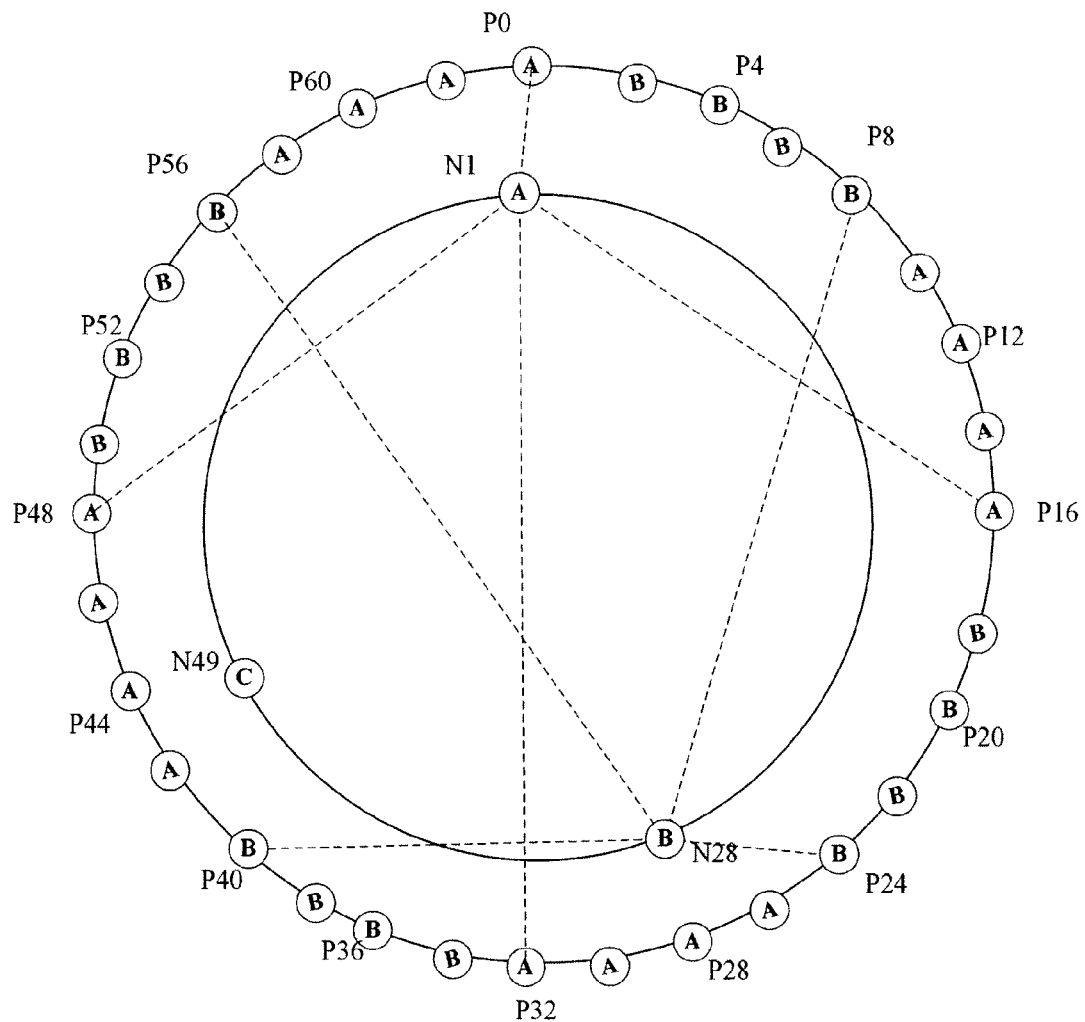
FIG. 11 is a schematic diagram after re-dividing the virtual identifiers according to Embodiment 6 of the disclosure.
Figure 12:
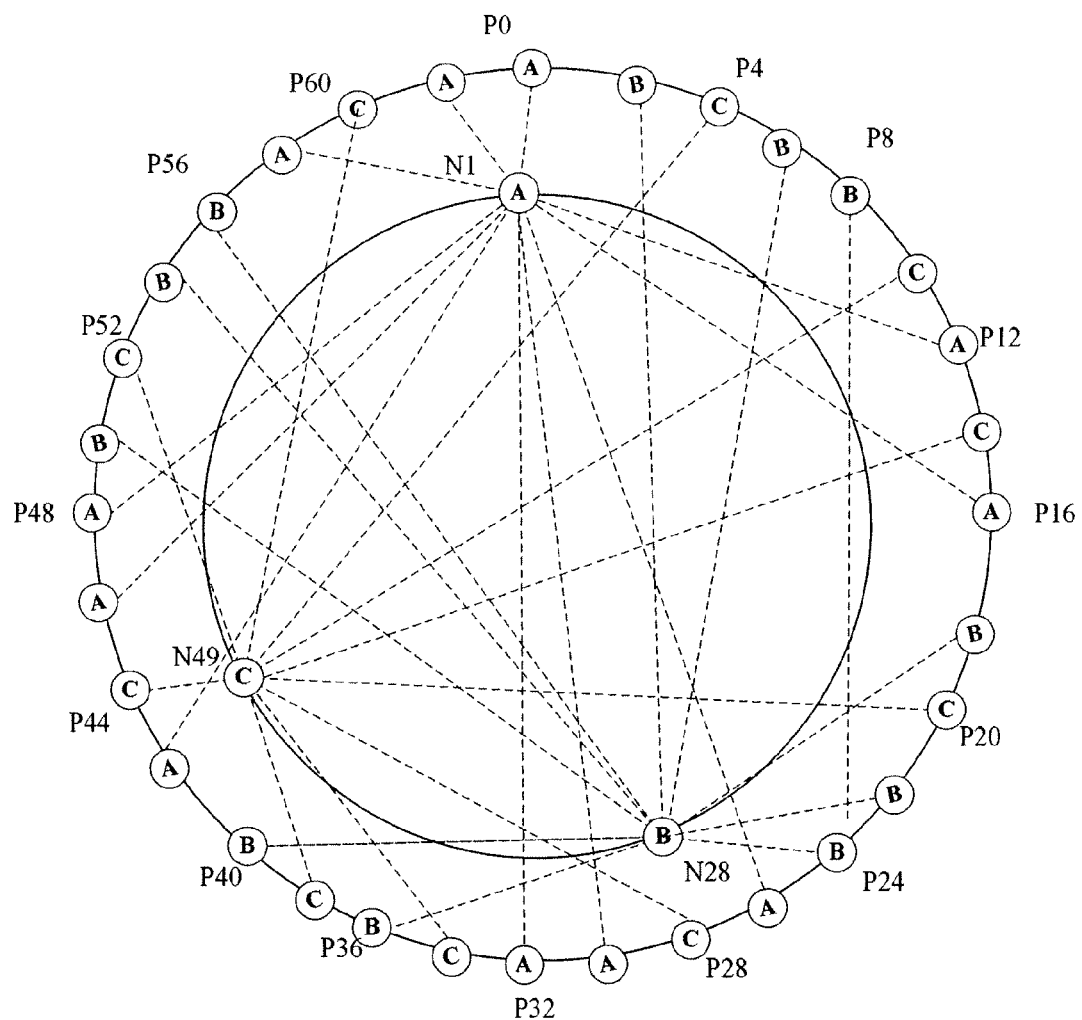
FIG. 12 is a schematic diagram of allocating the re-divided virtual identifiers to a new node according to Embodiment 6 of the disclosure.

If the load space corresponding to each virtual identifier is re-divided into M (supposed M=4) portions, the whole Hash space is divided by 32 virtual identifiers. As shown in FIG. 11, Node A is in charge of 16 virtual identifiers, and Node B is in charge of 16 virtual identifiers. After Node C is added, theoretically, the three nodes should be allocated with 11, 11 and 10 identifiers respectively. In this case, 5 virtual identifiers should be taken out from the virtual identifiers that Node A and Node B are in charge of and be allocated to Node C. Thus, two nodes actually in charge of the space of 22, and the other one is in charge of the space of 20 only. Then the load unbalance degree is 3.1%, 3.1% and −6.2% respectively, meeting the requirement. The node in charge randomly takes 5 virtual identifiers from Node A and Node B and allocates to the new Node C, as shown in FIG. 12.

From the description above, it can be seen that through the disclosure, data storage load balance in the whole DHT overlay network can be satisfactorily realized, and virtual identifiers can be automatically divided according to the scale of network nodes. Thus, this solution reduces workload for managing and transferring virtual identifiers and makes network expandable.

It is obvious for the person skilled in this art that, the modules or steps of the disclosure above can be also realized by a general computer device. They can be integrated in a single computer device or distributed on the network composed of several computer devices, or alternatively achieved by executable codes of a computer device, so as to store them in a storage unit for execution by a computer device, or make them into different integrated circuit modules or make multiple modules or steps of them to a single integrated circuit module for realization of the disclosure. In this way, the disclosure is not restricted to the combination of any specific hardware and software.

The description above is just the preferred embodiments of the disclosure, and is not intended to limit the disclosure. For the person skilled in this art, the disclosure can have various alterations and changes. Any such change, equivalent substitution or improvement made within the principle of the disclosure should be covered in the protection scope of the disclosure.

What is claimed is:

1. A method for realizing load balance in a Distributed Hash Table (DHT) network, comprising:
   determining, by a management service node of the Distributed Hash Table (DHT) network, a quantity Z of first virtual identifiers according to a node planning of the DHT network and a preset threshold of load unbalance degree, wherein Z is a natural number;
   equally dividing, by the management service node, a whole load space of the DHT network into Z portions, wherein each portion of the load space is respectively identified by one different first virtual identifier; and
   allocating, by the management service node, the Z first virtual identifiers to each node according to an ability of said each node, so that said each node is in charge of the load space corresponding to the first virtual identifiers allocated to said each node;
   wherein determining, by the management service node, the quantity Z of the first virtual identifiers according to the node planning of the DHT network and the preset threshold of load unbalance degree comprises: acquiring, by the management service node, a node with a poorest ability in the DHT network; and determining, by the management service node, the quantity Z of the first virtual identifiers according to the threshold of load unbalance degree, so as to make the load unbalance degree of the node with the poorest ability less than the threshold of load unbalance degree;
   wherein the quantity Z of the first virtual identifiers is determined to satisfy a formula of:

$$\frac{\frac{C_i}{\sum_{k=1}^{N} C_k} \times S + \frac{S}{Z}}{\frac{C_i}{\sum_{k=1}^{N} C_k} \times S} - 1 < LN,$$

wherein $C_i$ is a capacity of the node with the poorest ability, N is a total number of the nodes in the DHT network, S is the whole load space of the DHT network and LN is the threshold of load unbalance degree.

2. The method as claimed in claim 1, further comprising:
   adding, by the management service node, a new node to the DHT network;

according to ability of the new node, calculating, by the management service node, the quantity of the first virtual identifiers that the new node should be in charge of; and allocating, by the management service node, to the new node part of the first virtual identifiers under the charge of a node of the DHT network, the quantity of the first virtual identifiers under the charge of which exceeds a theoretical value, so as to make the quantity of the first virtual identifiers that the new node is in charge of close to the quantity of the first virtual identifiers that the new node should be in charge of.

3. The method as claimed in claim 2, wherein allocating, by the management service node, to the new node part of the first virtual identifiers under the charge of the node of the DHT network, the quantity of the first virtual identifiers under the charge of which exceeds the theoretical value comprises:

according to the ability of said each node in the DHT network, calculating, by the management service node, the theoretical value of the first virtual identifiers that said each node should be in charge of after a new node is added; and determining, by the management service node, for said each node whether the quantity of the first virtual identifiers that the node is currently in charge of exceeds the theoretical value of the node, and if yes, taking randomly the first virtual identifiers that exceed the theoretical value of the node from all the first virtual identifiers that the node is in charge of, and allocating the first virtual identifiers that exceed the theoretical value of the node to the new node.

4. The method as claimed in claim 2, further comprising:

the load unbalance degree of one node in the DHT network exceeding the threshold of load unbalance degree; and equally re-dividing, by the management service node, the load space corresponding to each first virtual identifier allocated to said each node into N portions, and identifying each portion of the load space equally re-divided with N×Z second virtual identifiers, wherein N is a natural number and M≥2.

5. The method as claimed in claim 4, wherein after identifying, by the management service node, said each portion of the load space equally re-divided with the M×Z, second virtual identifiers, the method further comprises:

adjusting, by the management service node, a quantity of the second virtual identifiers under the charge of said each node according to the load unbalance degree of said each node in the DHT network, so as to reduce the load unbalance degree of the node whose load unbalance degree exceeds the threshold of load unbalance degree.

6. The method as claimed in claim 4, wherein after identifying, by the management service node, said each portion of the load space equally re-divided with the M×Z second virtual identifiers, the method further comprises:

adding, by the management service node, a new node to the DHT network; and allocating, by the management service node, to the new node part of the second virtual identifiers under the charge of the node of the DHT network, the quantity of the second virtual identifiers under the charge of which exceeds a theoretical value, so as to make the quantity of the second virtual identifiers that the new node is in charge of close to the quantity of the second virtual identifiers that the new node should be in charge of.

7. The method as claimed in claim wherein identifying, by the management service node, said each portion of the load space equally re-divided with the M×Z second virtual identifiers comprises:

for the Z first virtual identifiers, generating, by the management service node, M−1 new virtual identifiers between two consecutive first virtual identifiers, and taking former virtual identifier of the two consecutive first virtual identifiers and the M−1 new virtual identifiers as M second virtual identifiers to identify the M portions of the load space equally divided from the load space corresponding to the former first virtual identifier.

8. The method as claimed in claim 1, further comprising:

adding, by the management service node, a new node to the DHT network;

equally re-dividing, by the management service node, the load space corresponding to each first virtual identifier into M portions and identifying each portion of the load space equally re-divided with M×Z second virtual identifiers, wherein N is a natural number and M≥2;

according to ability of the new node, calculating, by the management service node, a quantity of the second virtual identifiers that the new node should be in charge of; and allocating, by the management service node, to the new node part of the second virtual identifiers under the charge of a node of the DHT network, the quantity of the second virtual identifiers under the charge of which exceeds a theoretical value, so as to make the quantity of the second virtual identifiers that the new node is in charge of close to the quantity of the second virtual identifiers that the new node should be in charge of.

9. The method as claimed in claim 8, wherein allocating, by the management service node, to the new node part of the second virtual identifiers under the charge of the node of the DHT network, the quantity of the second virtual identifiers under the charge of which exceeds the theoretical value comprises:

according to the ability of said each node in the DHT network, calculating, by the management service node, the theoretical value of the second virtual identifiers that said each node should be in charge of after the new node is added; and determining, by the management service node, for said each node whether the quantity of the second virtual identifiers that the node is currently in charge of exceeds the theoretical value of the node, and if yes, taking randomly the second virtual identifiers that exceed the theoretical value of the node from all the second virtual identifiers that the node is in charge of, and allocating the second virtual identifiers that exceed the theoretical value of the node to the new node.

10. The method as claimed in claim 8, wherein identifying, by the management service node, said each portion of the load space equally re-divided with the M×Z second virtual identifiers comprises:

for the Z first virtual identifiers, generating, by the management service node, M−1 new virtual identifiers between two consecutive first virtual identifiers, and taking a former virtual identifier of the two consecutive first virtual identifiers and the M−1 new virtual identifiers as M second virtual identifiers to identify the M portions of the load space equally divided from the load space corresponding to the former first virtual identifier.

11. An apparatus for realizing load balance in a Distributed Hash Table (DHT) network, comprising: a hardware processor coupled with a memory and configured to execute program modules stored in the memory, wherein the program modules comprises:

a determination module, configured to determine a quantity Z of first virtual identifiers according to a node planning of the DHT network and a preset threshold of load unbalance degree, wherein Z is a natural number;

a dividing module, configured to equally divide a whole load space of the DHT network into Z portions, wherein each portion of the load space is respectively identified by one different first virtual identifier; and an allocating module, configured to allocate the Z first virtual identifiers to each node according to an ability of said each node, so that said each node is in charge of the load space corresponding to the first virtual identifiers allocated to said each node;

wherein the determination module is configured to determine the quantity Z of the first virtual identifiers according to the node planning of the DHT network and the preset threshold of load unbalance degree by: acquiring a node with a poorest ability in the DHT network; and determining the quantity Z of the first virtual identifiers according to the threshold of load unbalance degree, so as to make the load unbalance degree of the node with the poorest ability less than the threshold of load unbalance degree;

wherein the quantity Z of the first virtual identifiers is determined to satisfy a formula of:

$$\frac{\frac{C_i}{\sum_{k=1}^{N} C_k} \times S + \frac{S}{Z}}{\frac{C_i}{\sum_{k=1}^{N} C_k} \times S} - 1 < LN,$$

wherein $C_i$ is a capacity of the node with the poorest ability, N is a total number of the nodes in the DHT network, S is the whole load space of the DHT network and LN is the threshold of load unbalance degree.

12. The apparatus as claimed in claim 11, wherein the program modules further comprise:

a re-dividing module, configured to equally re-divide the load space corresponding to each first virtual identifier allocated to said each node into M portions, and identify each portion of the load space equally re-divided with M×Z second virtual identifiers, wherein M is a natural number and M≥2; and wherein the allocating module is further configured to allocate the M×Z second virtual identifiers to said each node according to the ability of said each node in the DHT network, so that said each node is in charge of the load space corresponding to a second virtual identifier allocated to said each node.

13. The apparatus as claimed in claim 12, wherein the program modules further comprise:

an updating module, configured to update a query routing table of the DHT network after the allocating module allocates the M×Z second virtual identifiers to said each node.

* * * * *